(12) United States Patent
Falco et al.

(10) Patent No.: US 6,700,869 B1
(45) Date of Patent: Mar. 2, 2004

(54) METHOD FOR CONTROLLING DATA FLOW ASSOCIATED WITH A COMMUNICATIONS NODE

(75) Inventors: Steven Anthony Falco, Morris Plains, NJ (US); Stephen Gregory Strickland, Holmdel, NJ (US); Ming-Hsu Tu, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/410,615

(22) Filed: Oct. 1, 1999

(51) Int. Cl.[7] .............................................. H04L 12/56
(52) U.S. Cl. ...................... 370/230; 370/412; 370/428
(58) Field of Search .............................. 370/230, 230.1, 370/231, 232, 235, 363, 368, 371, 374, 378, 381, 412, 413, 414, 428, 429

(56) References Cited

U.S. PATENT DOCUMENTS

| 4,146,839 | A | * | 3/1979 | Troy | ........................ 455/62 |
|---|---|---|---|---|---|
| 5,097,499 | A | | 3/1992 | Cosentino | |
| 5,528,513 | A | | 6/1996 | Vaitzblit et al. | |
| 5,838,922 | A | * | 11/1998 | Galand et al. | ............... 709/232 |
| 6,018,515 | A | * | 1/2000 | Sorber | ........................ 370/229 |
| 6,081,505 | A | * | 6/2000 | Kilkki | ........................ 370/230 |
| 6,091,709 | A | * | 7/2000 | Harrison et al. | ............ 370/235 |
| 6,246,691 | B1 | * | 6/2001 | Briem et al. | ................. 370/412 |
| 6,388,993 | B1 | * | 5/2002 | Shin et al. | ................... 370/233 |
| 6,438,138 | B1 | * | 8/2002 | Kamiya | ..................... 370/468 |
| 6,473,432 | B1 | * | 10/2002 | Nishimura et al. | ......... 370/412 |

\* cited by examiner

*Primary Examiner*—Chi Pham
*Assistant Examiner*—Anh-Vu H Ly

(57) ABSTRACT

A communications node admits the receive data message to the buffer memory if the receive arriving message falls within the capacity range of a class of the receive data messages and if the buffer memory is not congested. A state detector detects if the buffer memory is congested by evaluating the occupancy rate of the buffer memory, or otherwise. The capacity range determines the utilization of buffer memory by a particular class of data messages, which may be defined in accordance with an estimated economic value rating of the data messages.

28 Claims, 2 Drawing Sheets

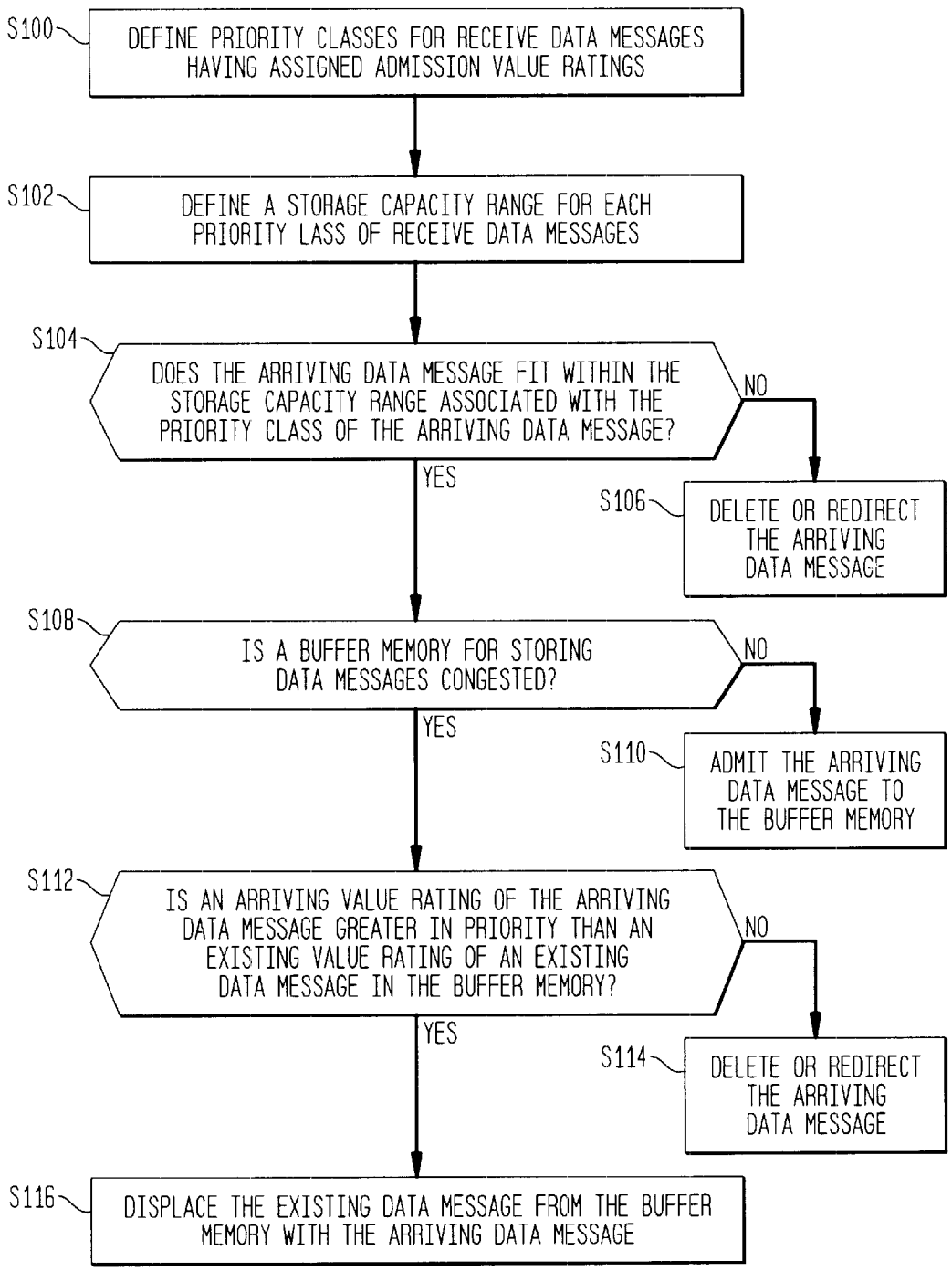

METHOD FOR CONTROLLING DATA FLOW ASSOCIATED WITH A COMMUNICATIONS NODE

FIELD OF THE INVENTION

This invention relates to a method for controlling data flow associated with a communications node; more specifically a communications node that services a wireless communications system.

BACKGROUND

A communications node is a computer or another network element that communicates with a communications network. A communications node may be configured to control store-and-forward operations between an input and an output of the communications node. In particular, the communications node may manage buffer memory to control store-and-forward operations. The management of the buffer memory may include an admission control approach for admitting data messages with time-out constraints. A time-out constraint provides an indication of the freshness or staleness of a data message stored in the communications node. A time-out constraint defines a maximum desired time difference between admittance of the data message to buffer memory and the transmittance of the data message from the buffer memory.

Some admission control approaches waste buffer memory resources. For example, if data messages are admitted whenever storage space is available in the buffer memory, the communications node will sometimes waste storage space by admitting a data message which cannot be forwarded within its time-out constraint. Further, the storage space occupied by the held data message blocks prevents other messages from entering the buffer memory for a duration exceeding the time-out constraint of the held data message, reducing space available for other data messages which could meet their time-out constraints.

Some communication nodes may be fortified with supplemental buffer memory in an attempt to compensate for the foregoing inefficiencies in the management of the buffer memory. However, the cost of a communications node generally increases with the complexity and quantity of buffer memory. The communications nodes may suffer reduced throughput because their memory capacity can not be expanded beyond a limit. Thus, a need exists for managing admission priority of data messages to reduce buffer memory requirements or to enhance throughput performance.

SUMMARY OF THE INVENTION

In accordance with the invention, a method for controlling data flow in a store-and-forward communication node includes deciding whether to grant or deny admission of data messages to the communications node.

A communications node assigns priority value ratings for determining whether to admit a receive data message to a buffer memory of the communications node. A state detector detects if the buffer memory is congested by evaluating the occupancy rate of the buffer memory, or the occupancy rate of at least one queue within the buffer memory. The communications node defines a storage capacity range for each class of priority value ratings of the receive data messages. The communications node admits the receive data message to the buffer memory if the receive arriving message falls within the capacity range of its class of priority value ratings and if the buffer memory is not congested. If the receive arriving message falls within the capacity range, and if the buffer memory is congested, the communications node may delete a lower priority data message to make room for the arriving data message. The foregoing enhancement to a communications node is well-suited for reducing handling time per data message and total memory capacity required to service an anticipated load of data messages at the communications node.

BRIEF DESCRIPTION OF THE DRAWINGS

FIG. 2 is a flow chart of a dynamic method for controlling admission of data messages to a communications node in accordance with the invention.

DETAILED DESCRIPTION

Figure 1:
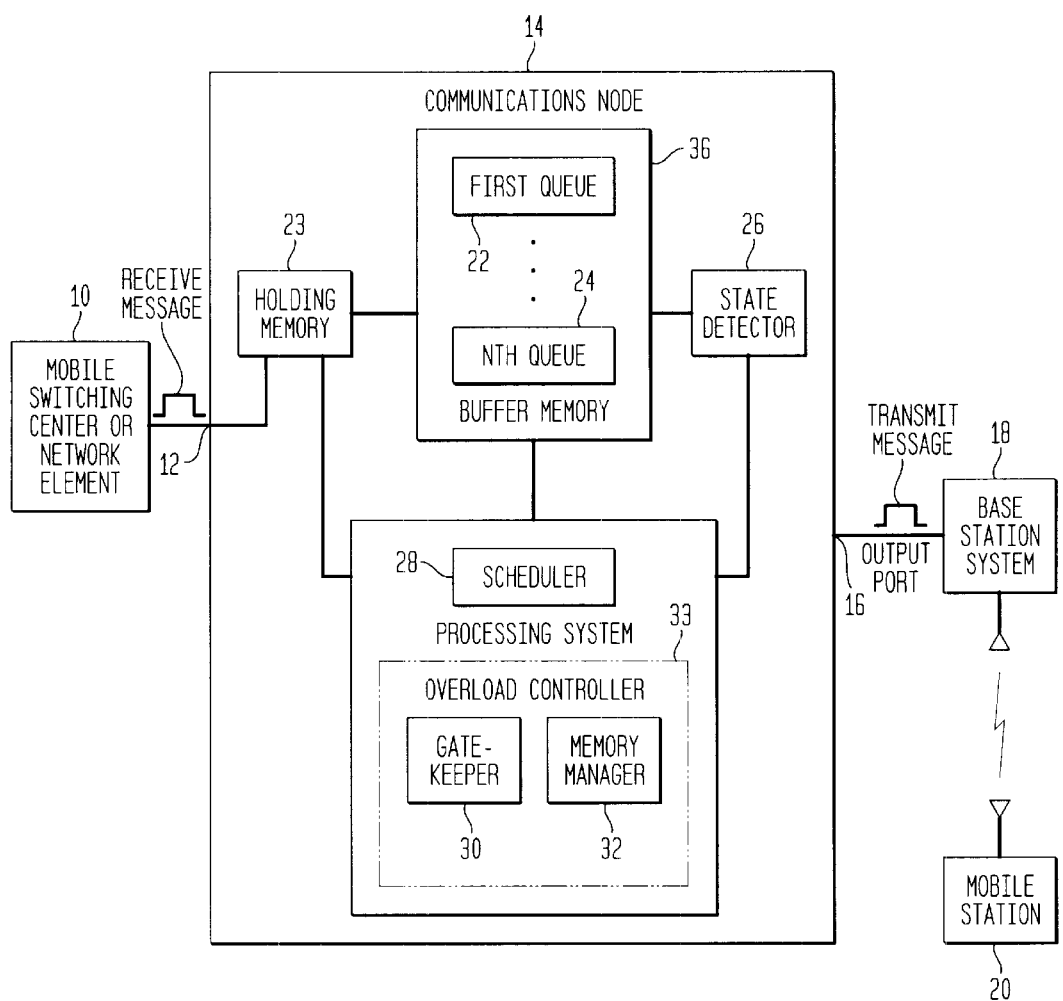
FIG. 1 is a block diagram of a wireless communications system that includes a communication node in accordance with the invention.

In accordance with the invention, FIG. 1 shows a store-and-forward communications node 14 that receives receive data messages from a mobile switching center 10, or another network element, at an input 12. If the receive data messages are accepted in accordance with an admission priority scheme, the store-and-forward communications node 14 stores the receive data messages in a buffer memory 36. The buffer memory 36 is logically organized into a group of queues, ranging from a first queue 22 to an nth queue 24. The communications node 14 selects receive data messages from one or more queues to be transmitted as transmit data messages in accordance with a transmission priority scheme. In a preferred embodiment, the output 16 of the store-and-forward communications node 14 is coupled to a base station transmitter for a downlink transmission to one or more mobile stations 20. Although the communications node 14 is shown coupled between the mobile switching center 10 and the base station 18, in an alternate embodiment the communications node may be integrated with a mobile switching center or a base station system.

The communications node 14 includes a processing system 34 coupled to a holding memory 23, a buffer memory 36, and a state detector 26. The processing system 34 hosts a scheduler 28 for managing the transmission priority scheme and an overload controller 33 for handling an admission priority scheme. In practice, a store-and-forward communications node 14 may comprise a router, such as an enhanced digital radio unit (EDRU) for a digital wireless communications system with a priority-based admission and scheduling scheme. The state detector 26 monitors, or otherwise detects, occupancy rate states of the buffer memory 36 or at least one queue within the buffer memory 36. For example, the state detector 26 may measure an occupancy state rate of each active (i.e., partially or completely filled) queue on a regular or periodic basis. The state detector 26 is configured to communicate occupancy rate states with the processing system 34.

The overload controller 33 may include an gatekeeper 30, a memory manager 32, or both. The gatekeeper 30 controls the admittance of a receive data message to the buffer memory 36 of the store-and-forward communications node 14 from the holding memory 23 based on a status of the buffer memory 36. For example, if the buffer memory 36 is full, the gatekeeper 30 may refuse to admit a receive data message to the buffer memory 36 for processing. If the buffer memory 36 is not full, the gatekeeper 30 may admit the receive data message for processing or storage by the communications node 14. Further, the gatekeeper 30 executes additional conditions, imposed by the processing system 34, for admittance into the buffer memory 36.

The memory manager 32 may delete an existing message in the buffer memory 36 to make room for a more recent receive data message currently at the input 12 or in the holding memory 23 of the communications node 14. Ideally, the average arrival rate of receive data messages at the input 12 of the communications node 14 is less than or equal to the average output 16 rate of corresponding transmit data messages associated with the receive data messages such that deletion of data messages is not necessary. However, the transient or average arrival rate may be greater than the average output rate of the data messages such that the deletion of one or more data messages may become a practical necessity.

In an alternate embodiment, the buffer memory manager 32 makes preemptive deletions of data messages where existing data messages in the buffer memory 36 are deleted before a queue fills. For example, the buffer memory manager 32 may establish preemptive deletions to preserve space for "important" messages and/or simplify processing. The preservation of such space can be configured to meet anticipated demand during peak busy periods. Although the queues may have static maximum sizes, dynamic maximum sizes are preferable to enhance the flexibility of the memory management. The communications node 14 may configure dynamic maximum queue lengths on demand to cover the ongoing traffic patterns of data messages through the communications node 14, rather than fixing static maximum queue lengths based on a potentially arbitrary prediction of actual traffic patterns.

Depending on the performance measures of interest and constraints on complexity, the overload controller 33 may entail a wide variety of admission control algorithms, overload control algorithms, or both. The gatekeeper 30 or the overload controller 33 includes a dynamic admission control algorithm, as will be described in greater detail below. Under the direction of an admission control algorithm or an overload control algorithm of the invention, the overload controller 33 facilitates the efficient use of the buffer memory 36. Further, the overload controller 33 manages the allocation of the existing buffer memory 36 to satisfy throughput demands under specified time constraints.

The store-and-forward communications node 14 may transmit the stored data messages from the buffer memory 36 as transmit data messages on the downlink channel to a mobile station 20. Because the receive data message may have different characteristics than the transmit data message and because of transmission limitations of the air interface, the communications node 14 may store, buffer, or otherwise process the receive data message before transmitting the receive data message over the airlink as a transmit data message.

The processing system 34 may format or structure the receive or stored data message into a format as a transmit data message that is compatible for transmission over a downlink channel to the mobile stations 20. The data messages may be transmitted over any type of communications channel, including a voice, data, or control channel. For example, in the context of a time division multiple access system (TDMA), the processing system 34 may facilitate the transmission of transmit data messages over a downlink digital control channel (DCCH) and a subchannel (e.g., short messaging service/paging channel (SPACH)) of the digital control channel. The SPACH provides channel assignments over a downlink signal and may support one-way or two-way short messaging service. The DCCH airlink protocol over a TDMA system provides a maximum number of time slots (e.g., 21) in each superframe interval (e.g., 640 millisecond interval) for transmitting a data message.

Although the communications node 14 can readily predict a transmission departure time for a receive data message where the communications node 14 communicates to a downstream TDMA wireless system, other wireless communication systems (e.g., Global System for Mobile Communications (GSM) or code-division, multiple-access systems) may use the system and method for controlling data flow; hence, fall within the scope of the invention.

The scheduler 28 assigns transmit priorities to receive data messages waiting in the buffer memory 36 for transmission as transmit data messages. Although the scheduler 28 may use any type of priority scheme for the data messages, in one example the scheduler 28 assigns receive data messages transmission priorities based on graduated priority rules that vary with different occupancy rates of the queues (22, 24). The occupancy rates of the queues (22, 24) are provided by the state detector 26.

Graduated priority rules encompass schemes, for example, where as the occupancy rates of queues in the buffer memory 36 increase, the assignment of transmission priorities for newly received messages may vary from the previously received messages. Transmission priorities could be assigned such that only critical data messages receive high transmission priorities, while all other data messages receive artificially low transmission priorities by comparison to previously or historically received messages. Critical data messages may be data messages related to public safety, emergency operations, "911" systems, or the like.

A transmission priority scheme refers to a fixed ranking of the queues associated with the time slot. Each queue may represent a certain overall transmission priority level that is consistent with the contributing transmission priority levels of one or more time slots serving the queue. The processing system 34 examines the queues in their order of their overall transmission priority and the scheduler 28 selects the first message in the first non-empty queue. Thereafter, the second message in the first non-empty queue is selected until all the messages in the first-non-empty queue have been sent. Subsequently, the scheduler 28 examines the second non-empty queue and selects the first message in the second non-empty queue and so on.

The scheduler 28 only assigns transmit priorities to data messages where more than one message is waiting in the buffer memory 36 or a given queue. If is only one receive data message is waiting in a buffer memory 36 or an active queue, no judgment on transmit priority needs to be made and the single receive data message may be transmitted immediately or when the next transmit opportunity arises. A superframe for transmission from the communications node may contain special-purpose time slots and all purpose time-slots. The special service time-slots are restricted to serving some subset of the queues, whereas the general purpose time slots serve any of the queues.

For TDMA applications of the communications node 14, a precise understanding of transmit opportunities for the transmit data messages requires knowledge of the DCCH downlink operation. Under current TDMA standards, for example, during every superframe interval duration (e.g., 640 millisecond interval), the communications node 14 has a maximum number (e.g., 21) of time slots in which it can send messages. For reasons of battery conservation, mobiles typically "sleep" (power down) during all but one of these slots; this "listening" time slot for each mobile is randomly assigned among a group of time slots (.e.g., 19) within the superframe interval so as to evenly distribute the mobiles. The initial communication with a mobile to set up a voice or data transmission must occur in this slot. In many cases, when a mobile receives one of these messages, it remains awake and listens to all time slots within the superframe interval.

The method of FIG. 2 addresses dynamically controlling admittance of data messages to the buffer memory 36. An overload controller 33 or a gatekeeper 30 determines whether or not to admit a receive data message to buffer memory 36 of the communications node 14.

In step S100, the communications node first assigns or establishes an admission value rating associated with each receive data message. Secondly, a communications node 14 defines priority classes for the receive data messages having the assigned admission value ratings. Data messages with comparable admission value ratings are grouped into the same priority class between or among different priority classes. Comparable admission value ratings refers to value ratings which fall within a defined range of each other.

Each priority class may contain one or more data messages with comparable admission value ratings. Within each priority class, each message has an intra-class admission rank to establish a priority ranking for the receive data messages allocated to an individual priority class. For example, the intra-class admission rank may represent an arrival time of arrival of each receive data message relative to the other data messages within the individual priority class.

Although an admission value rating can be assessed in various ways, the primary technique is the potential of a particular receive data message to generate revenue for a service provider. For example, the overload controller 33 may assign a higher value rating to a first receive message representing a channel assignment than a second receive data message representing a paging request, regardless of the order of arrival of the first receive message and the second receive message at the communications node 14. In practice, the channel assignment nearly always results in a billable call-completion, whereas only a fractional, successful number out of the total attempted number of paging messages to mobile stations 20 result in a completed call. Mobile stations may be turned-off or out of range which leads to the lack of call completions originating from paging requests. Thus, channel assignments are considered more valuable than paging messages. Accordingly, the overload controller 33 may recognize a low priority class for paging data messages and one or more higher priority classes for channel assignment data messages.

Besides revenue generation potential, the admission value rating may be based upon a first-come, first-serve time priority technique, a waiting-time limit of the receive data message, a data packing constraint associated with transmission of the receive data message as a transmit data message, size of the receive data message, or by any other suitable technique. In one example, a data packing constraint may consider allocations of time slots in a superframe to certain corresponding queues within the buffer memory 36. The foregoing allocations can impact data messages awaiting delivery in the queues. In another example, receive data messages of smaller size may be assigned a higher value rating than receive data messages of a larger size or longer length.

After step S100 or simultaneously with step S100, in step S102 the communications node defines a storage capacity range for each priority class of receive data messages. Each priority class is associated with a corresponding storage capacity range. The overload controller 33 allocates a storage capacity range for the receive data messages upon receipt of the receive data messages at the holding memory 23. The capacity range determines the utilization of buffer memory 36 by a particular class of data messages.

In step S102, the capacity range may be defined by an upper boundary, a lower boundary, or both. An upper boundary of the range limits a maximum number of receive data messages per admission priority class. The upper boundary prevents any single admission class from dominating the buffer memory 36 at the expense of other admission classes.

In contrast, a lower boundary of the range reserves a minimum buffer storage space for data messages of at least one hierarchical class. The upper boundary prevents any group of admission classes from dominating the buffer memory 36 at the expense of other admission classes. The lower boundary allows minority classes to coexist with higher level or majority classes such that any essential operations represented by the minority classes are not overlooked in a manner that negatively impacts communications system operation.

Although the upper boundary and the lower boundary are defined in terms of the number of messages per class in one illustrative embodiment, in other embodiments the upper boundary and lower boundary may be defined in terms of an overall size of the data messages in a class or by a maximum usable portion of the buffer memory 36. For example, a priority class may have an upper boundary within a range from one-third to two-thirds of the entire buffer memory 36.

After step S102 in step S104, the communications node determines if the arriving data message would fit within the storage capacity range associated with the priority class of the arriving data message. The overload controller 33 enforces upper bound rules on the number of messages of each class which are allowed in the buffer memory 36. The upper-bound rule provides that an arriving message is dropped whenever the number of messages of its class in the buffer memory 36 is equal or exceeds an upper boundary. For example, based on simulation studies, the dynamic algorithm may be initially tuned to set an upper boundary of a particular priority class to one third of the overall buffer memory 36 capacity.

The storage capacity range prevents a sustained overload of a particular class of data messages. Without the intervention and proper operation of the storage capacity range determination in step S104, the overload class could displace the other message classes and "capture" the entire buffer. While the upper-bound rules prevent one class from capturing the buffer, the upper-bound rules do not prevent a class from being excluded due to an overload over a group of classes. In accordance with the reservation rules, the overload controller 33 reserves a nominal number of buffers for each class by using the following reservation rule to determine admissibility of a data message. Although a buffer may be defined as the memory size that may be transmitted in a single time-division multiplex frame or superframe, a buffer preferably represents any unit of memory size (e.g., number of bits, bytes, words, or blocks) or a defined portion of the entire buffer memory 36. The overload controller 33 defines $b_j$ as the buffer reserve for priority class j, distinct from priority class i, $n_i$ as the current number of buffers used by class i, $n_j$ as the current number of buffers used by class j, and K as the total buffer capacity of the entire buffer memory 36. The gatekeeper 30 admit a priority class i message only if $$n_i + \sum_{j \neq i} \max(b_j, n_j) < K$$

That is, the total number of buffers in-use or reserved is less than the overall supply. Note that $n_i$ term is pulled out of the sum to avoid counting its reserve as in-use when a class i message arrives.

If the arriving data message would not fit within the storage capacity range, the arriving data message is deleted or redirected as indicated in step S106.

If the arriving data message would fit within the storage capacity range associated with the priority class of the arriving data message, the method continues with step S108. In step S108, the communications node 14 determines if a buffer memory 36 for storing data messages is congested. Congested means filled to a certain threshold capacity. Although several congestion evaluation techniques may be used, in a preferred example a state detector determines whether the buffer memory 36 is congested based upon an analysis of the occupancy rate of the entire buffer memory 36, rather than any particular priority class. For example, if the actual occupancy rate of the buffer memory 36 exceeds a buffer threshold occupancy rate, the buffer memory 36 is considered to be congested. The storage capacity range and the congestion buffer memory 36 are preferably defined in a distinct manner such that the congestion evaluation facilitates the overall throughput performance of the entire buffer memory 36, whereas the storage capacity range facilitates the throughput performance of individual classes of data messages.

In an alternate embodiment, other suitable techniques for evaluating congestion include determining if an actual occupancy rate of one queue exceeds a queue threshold occupancy rate or determining if an actual occupancy rate of a group of queues exceeds a combination threshold occupancy rate. During the congestion evaluation, the queue or the group of queues is associated with a priority class that is suitable for accepting a particular receive data message under evaluation for admission to that queue or that group of queues.

The buffer threshold occupancy rate represents some workable capacity less than a maximum physical capacity of the entire buffer memory 36. The occupancy rate is evaluated over a series of sequential sampling periods, wherein each sampling period may be associated with a corresponding occupancy rate that ordinarily remains valid for an arriving message until updated with another occupancy rate from the next sampling period.

The buffer threshold occupancy rate is consistent with an overflow target probability. The overload controller 33 can substantially reduce the provisioned storage to a workable capacity of the threshold occupancy rate if the service provider or user is willing to tolerate some probability of overflow. The buffer threshold occupancy rate may be selected based upon empirical data consistent with realistically minimizing deletions of receive data messages. For example, with an overflow probability of one-tenth of one percent, the overload controller 33 reduce the storage requirement by perhaps a factor of five or ten.

For a communications node 14 operating in conjunction with a wireless communications system, no simple analytic expression relates storage size to the overflow probability. Thus, the dynamic based admission control algorithm operates with some simplifying assumptions to manage or minimize data loss.

In an alternate embodiment, the congestion may be defined in terms of the workload durations of one or more of the queues. The workload duration a queue of the buffer memory 36 represent the transmission time required to transmit all data messages in the queue at any particular time from the buffer memory 36, consistent with reliable communication over the air interface of the base station system. For example, if the workload duration of all of the queues together exceeded a threshold time, the buffer memory 36 could be regarded as congested. In yet another embodiment, the congestion may be defined in terms of queue length exceeding threshold queue length.

If the buffer memory 36 for storing data messages is not congested, the communications node admits the arriving data message to the buffer memory 36 as indicated in step S110.

However, if the buffer memory 36, or under other approaches at least one queue, is congested, the method continues in step S112. In step S112, the communications node determines if a held value rating of a held or arriving data message has a greater value rating than an existing priority class of an existing stored data message in the buffer memory 36. The determination of step S112 may be defined in terms of a push-out or displacement rule. The push-out rule admits a data message if the receive data message complies with a hierarchical evaluation of the priority classes. Although a preferred embodiment features one value rating per priority class, in an alternate embodiment, multiple value ratings per a single priority class are supported.

In general, the push-out rules define an admission hierarchy among admission value ratings, the priority classes, or both. The push-out rules alter the distribution of overflow losses among the various message priority classes. For example, push-out rules typically allow more "valuable" messages to displace (or push-out) lower value messages when the buffer memory 36 is full. If an arriving message encounters a full buffer memory 36, the overload controller 33 attempts to displace a lower admission priority message. The overload controller 33 looks first at the lowest priority stored message, then works up the hierarchy until a stored data message of the same priority or higher than the arriving data message is reached, to find the lower priority stored message for deletion or displacement.

After step S112, if the arriving priority class is lower than the existing priority class, the communications node deletes or redirects the data messages as indicated in step S114. If a rejected data message is redirected from the communications node with congested buffer memory 36, the rejected data message may be redirected to an additional communications node acting in cooperation with the communications node to enhance throughput of the communications node 14 or provide redundancy for rejected data messages of having a sufficient or minimum admission value rating.

If the held value rating of a held data message in the holding memory 23 is greater in priority than a stored value rating of an existing stored data message in the buffer memory 36, the method continues with step S116. In step S116, the communications node 14 displaces the existing data message from the buffer memory 36 with the arriving data message. A held data message with the higher priority value rating is allowed to push out a lower priority message, even if the higher priority message arrived after the lower priority message at the input 12 of the communications node 14.

The displacement of step S116 may be accomplished by first deleting a lower priority data message from the buffer memory 36, or by merely overwriting a lower priority data message with a higher priority data message. For example, the gatekeeper 30 admits a first receive data message at the input 12 with a first assigned value rating by displacing a second receive data message with a second assigned rating value lower than the first assigned value rating according to the hierarchical admission rules.

In one example, the low priority messages may be divided among X different queues in the buffer memory 36; the processing system 34 may use a rotating pointer to distribute push outs among these X queues, wherein X is any whole number. Whenever a push-out is attempted, the pointer is incremented (e.g., mod X in a round-robin manner). If an arriving message does not belong to the high-priority group of classes, or the push-out queue is empty, the message is dropped when the buffer is full.

In sum, the gatekeeper 30 accepts a receive data message from the holding memory 23 if the receive data message falls within the capacity range associated with the class of the data message and if the buffer memory 36 is not congested. If the buffer memory 36 is congested, a push-out evaluation is completed to determine whether or not to displace a stored data message in the buffer memory 36 with an arriving receive data message. The arriving receive data message may remain in the holding memory 23 until the receive data message is admitted to the buffer memory 36, deleted, or redirected.

This specification describes various embodiments of the method of the present invention. The scope of the claims is intended to cover various modifications and equivalent arrangements of the illustrative embodiments disclosed in the specification. Therefore, the following claims should be accorded the reasonable broadest interpretation to cover the modifications, equivalent structures, and features which are consistent with the spirit and the scope of the invention disclosed herein.

What is claimed is:

1. A method for controlling data flow in a store-and-forward communications node, the method comprising the steps of:
    assigning priority value ratings for determining whether to admit a receive data message to a buffer memory of a communications node;
    detecting if the buffer memory is congested;
    defining a storage capacity range for each class of priority value ratings of the receive data messages;
    admitting the receive data message to the buffer memory if the arriving receive data message falls within the capacity range and if the buffer memory is not congested; and
    displacing a stored data message in the buffer memory with the arriving receive data message if the arriving receive data message has a first assigned rating value higher than a second assigned value rating of the stored data message and if the buffer memory is congested.

2. The method according to claim 1 wherein the assigning step comprises assigning intra-class priority ranks to establish an admission hierarchy of receive data messages within a particular class.

3. The method according to claim 1 wherein the detecting step comprises:
    determining that the buffer memory is congested if an actual occupancy rate of the buffer memory exceeds a threshold occupancy rate.

4. The method according to claim 1 wherein the detecting step comprises:
    determining that the buffer memory is congested if an actual occupancy rate of a queue exceeds a queue threshold occupancy rate, the queue being suitable for accepting the receive data message based on its priority class.

5. The method according to claim 1 wherein the detecting step comprises:
    determining that the buffer memory is congested if an actual occupancy rate of a combination of queue occupancy rates exceeds a threshold combination occupancy rate, each queue of the combination being suitable for accepting the receive data message based on its priority class.

6. The method according to claim 1 further comprising the step of:
    displacing a stored data message in the buffer memory with an arriving receive data message if the arriving receive data message has a first assigned rating value higher than a second assigned value rating of the stored data message and if at least one queue within the buffer memory is congested.

7. The method according to claim 1 further comprising the step of:
    assigning the priority value rating to the receive data message based on a revenue generating factor associated with the receive data message.

8. The method according to claim 1 further comprising the step of:
    assigning a higher value rating to a first receive data message representing a channel assignment than a second receive data message representing a paging request.

9. The method according to claim 8 wherein the admitting step further comprises:
    displacing the second receive data message from the buffer memory upon arrival of the first receive data message at an input, if the detection step determines the buffer memory is congested.

10. The method according to claim 1 wherein the admitting step further comprises:
    distributing displacement of receive data messages from the buffer memory among a plurality of queues within the buffer memory when receive data messages with higher value ratings displace data messages with lower value ratings.

11. The method according to claim 1 wherein the defining step comprises:
    limiting a maximum number of receive data messages per priority class to be admitted to the buffer memory to comply with an upper boundary of the storage capacity range.

12. The method according to claim 11 further comprising the step of:
    not admitting a data message into the buffer memory if the number of stored data messages in the buffer memory for the priority class associated with the held data message exceeds the maximum number.

13. The method according to claim 1 wherein the defining step further comprises:
    limiting a maximum storage capacity size for receive data messages per priority class to be admitted to the buffer memory to comply with an upper boundary of the storage capacity range.

14. The method according to claim 13 further comprising the step of:
   setting the maximum storage capacity size as one third of the overall memory buffer capacity.

15. The method according to claim 1 wherein the defining step comprises:
   reserving a minimum number of queues for data messages of at least one priority class as a lower boundary of the range.

16. The method according to claim 1 wherein the defining step further comprises:
   reserving a minimum class storage capacity size for data messages of at least one priority class as a lower boundary of the range.

17. The method according to claim 16 wherein the minimum class storage capacity size is defined as a number of buffers reserved in accordance with the following formula:

$$n_i + \sum_{j \neq i} \max(b_j, n_j) < K,$$

wherein $b_j$ is a buffer reserve for priority class j distinct from priority class i, $n_i$ is the current number of buffers used by class i, $n_j$ is the current number of buffers used by class j and K is the total buffer capacity of the buffer memory.

18. The method according to claim 1 wherein the admitting step further comprises:
   displacing a stored data message from the buffer memory upon arrival of a later receive data message at an input, where the stored data message has an oldest arrival time within the priority class.

19. The method according to claim 1 wherein the admitting step further comprises:
   displacing a stored data message from the buffer memory upon arrival of a later receive data message at an input, where the stored data message has an oldest arrival time within a queue in the buffer memory.

20. The method according to claim 1 wherein the admitting step further comprises:
   displacing a stored data message from the buffer memory upon arrival of a later receive data message at an input, where the stored data message has an oldest arrival time in the entire buffer memory.

21. The method according to claim 1 further comprising the step of:
   displacing a stored data message in a buffer memory with an arriving receive data message if the arriving receive data message has a more recent arrival time than that of the stored data message and if the buffer memory is congested.

22. A communications node comprising:
   an overload controller for assigning priority value ratings for determining whether to admit a receive data message to a buffer memory of a communications node, the overload controller defining a storage capacity range for each class of priority value ratings of the receive data messages;
   a detector for detecting if the buffer memory is congested;
   a gatekeeper for admitting the receive data message to the buffer memory if the arriving receive data message falls within the capacity range and if the buffer memory is not congested; and
   a memory manager for displacing a stored data message in the buffer memory with the arriving receive data message if the arriving receive data message has a first assigned rating value higher than a second assigned value rating of a stored data message and if the buffer memory is congested.

23. The communications node of claim 22 further comprising:
   a holding memory for holding the receive data message prior to admittance to the buffer memory.

24. The communications node of claim 23 wherein, the memory manager is for deleting an existing data message in the buffer memory to make room for a more recent receive data message in the holding memory of the communications node.

25. The communications node of claim 22 wherein, the memory manager is for deleting an existing data message in the buffer memory to make room for a more recent receive data message at an input of the communications node.

26. The communications node of claim 22 where in the detector is adapted to detect the occupancy rate of the buffer memory.

27. The communications node of claim 22 where in the detector is adapted to detect the occupancy rate of a group of queues within the buffer memory.

28. A method for controlling data flow in a store-and-forward communications node, the method comprising:
   reserving a minimum class storage capacity size for data messages of at least one priority class as a lower boundary of a range; wherein the minimum class storage capacity is defined as a number of buffers reserved in accordance with the following formula:

$$n_i + \sum_{j \neq i} \max(b_j, n_j) < K,$$

wherein $b_j$ is a buffer reserve for priority class j distinct from priority class i, $n_i$ is the current number of buffers used by class i, $n_j$ is the current number of buffers used by class j and K is the total buffer capacity of the buffer memory.

* * * * *